(12) United States Patent
Byers et al.

(10) Patent No.: US 6,527,366 B1
(45) Date of Patent: Mar. 4, 2003

(54) METHOD AND ARRANGEMENT FOR COLOR SUBSTITUTION IN A MULTI-COLOR PRINTING DEVICE

(75) Inventors: Mark A. Byers, Macedon, NY (US); William J. De Beaubien, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/941,097

(22) Filed: Aug. 28, 2001

(51) Int. Cl.[7] .................................................. B41J 2/21
(52) U.S. Cl. ............................. 347/43; 347/15; 347/19
(58) Field of Search ............................. 347/43, 15, 19, 347/85, 86; 358/1.9

(56) References Cited

U.S. PATENT DOCUMENTS

| | | | |
|---|---|---|---|
| 5,581,284 A | * 12/1996 | Hermanson | 347/43 |
| 5,778,160 A | 7/1998 | Smith | 358/1.9 |
| 6,019,460 A | 2/2000 | Ushiogi et al. | 347/85 |
| 6,064,493 A | 5/2000 | Neff | 358/1.9 |
| 6,139,135 A | 10/2000 | Becker et al. | 347/85 |
| 6,196,663 B1 * | 3/2001 | Wetchler et al. | 347/43 |
| 6,196,670 B1 | 3/2001 | Saruta | 347/86 |
| 6,217,150 B1 | 4/2001 | Heydinger | 347/43 |

* cited by examiner

Primary Examiner—Lamson Nguyen
(74) Attorney, Agent, or Firm—Maginot, Moore & Bowman

(57) ABSTRACT

An apparatus for generating printer data from application print data, the apparatus including a memory and a processor. The memory stores the application print data. The processor is coupled to the memory and is further adapted to be coupled to receive printer status data from a multi-color printer. The processor is also adapted to provide printer data to the multi-color printer. The processor is operable to obtain from the printer status data information identifying a first color ink for which printing is inhibited. The processor is also operable to identify one or more substitute color inks from a set of color inks for which printing is not inhibited. The processor is further operable to generate printer data from application print data, substituting the one or more substitute color inks when print data requires the first color ink.

20 Claims, 7 Drawing Sheets

| DEFAULT SUBSTITUTION ||
|---|---|
| EMPTY | REPLACEMENT |
| CYAN | MAGENTA |
| MAGENTA | YELLOW |
| YELLOW | CYAN |
| BLACK | CYAN MAGENTA YELLOW (PROCESS BLACK) |

*FIG. 6*

METHOD AND ARRANGEMENT FOR COLOR SUBSTITUTION IN A MULTI-COLOR PRINTING DEVICE

FIELD OF THE INVENTION

The present invention relates generally to multi-color printing devices, and in particular, multi-color printing devices that employ a plurality of color inks.

BACKGROUND OF THE INVENTION

Multi-color printing devices have grown substantially in popularity because of their versatility and the increasing use of color printing software applications. Multi-color printing devices include, among others, color ink jet printers and color electrophotographic printing machines. Multi-color printing devices typically include ink reservoirs containing a plurality of color inks, which may then be blended to create a large plurality of shades and tones of color. Such ink reservoirs often take the form of a liquid ink cartridge or toner cartridge. However, other ink reservoirs can include solid ink sticks or other media. Each ink reservoir supplies the ink to the application device, for example, an ink jet print head or a electrophotographic machine development system.

For example, a color ink-jet printer typically has ink reservoirs containing four color inks, including cyan, magenta, yellow and black. Such colors may be blended to create hundreds of different hues and tones of color.

An important part of the printing process in ink-jet printers, as well as other printing devices, is the blending of colors to arrive at the appropriate color. With respect to ink jet printing, the color data typically originates from a software application. That color data is in a format referenced herein as application print data. For example, photo-editing, chart-making, drawing and other software applications generate application print data that includes both image and color information. The application print data, however, must be converted to information used by the printing device to create the intended output.

To this end, control software that is typically, but not necessarily, executed by a processor in a general purpose computer, converts the application image data into raster data, and converts the application color information from the color space employed by the application to printer color space. At present, most software applications employ a color space that expresses colors in terms of combinations of red, blue and green. Such a color space, called the RGB color space, is typically employed in software applications because the RGB color space is compatible with video display equipment. By contrast, the colors in printer color space are typically expressed as combinations of cyan, magenta, yellow and black.

In any event, once the raster data and printer color data are generated, control devices within the printer cause the print-head of the printer to apply corresponding amounts of cyan, magenta, yellow and black ink during the scanning of the document to produce the appropriate image.

A problem arises in multi-color printing devices when the ink reservoir(s) associated with a particular color are empty. Because each ink color constitutes a fundamental constituent of a large number of colors, loss of a particular color typically renders the accurate reproduction of a multi-color image impossible.

As a result, in prior art printing apparatus, the printer controller would typically halt printing upon detection of an empty ink cartridge. The printer controller would not allow resumption of printing until the ink cartridge was replaced. Halting printing, while extremely inconvenient, prevents erroneous and nonsensical printing results when the printer lacks the ink to print in accordance with its printer data. Nevertheless, the inconvenience of suspending a print job is particularly amplified when replacement ink reservoirs are not readily available.

There exists a need, therefore, for reducing the inconvenience associated with the situation in which the ink reservoir for a particular color ink is empty. There is a further need to reduce such inconvenience while providing at least some printing utility.

Patents of general background interest, but which do not address the above stated needs include U.S. Pat. No. 5,778,160 to Smith, U.S. Pat. No. 6,019,460 to Ushiogi et al., U.S. Pat. No. 6,064,493 to Neff, U.S. Pat. No. 6,139,135 to Becker et al., U.S. Pat. No. 6,196,670 to Saruta, and U.S. Pat. No. 6,217,150 to Heydinger.

SUMMARY OF THE INVENTION

The above needs, as well as others, are addressed by providing a method and arrangement for controlling a multi-color printing device that identifies and applies a substitute color ink for a color ink whose ink reservoirs are empty. While the substitute color may not provide optimal results, it allows printing to continue and allows of the data to be printed.

Embodiments of the subject invention include an apparatus for generating printer data from application print data. The apparatus includes a memory and a processor. The memory stores the application print data. The processor is coupled to the memory and is further adapted to be coupled to receive printer status data from a multi-color printer. The processor can provide printer data to the multi-color printer. The processor can obtain from the printer status data information identifying a first color ink for which printing is inhibited. The processor can also identify one or more substitute color inks from a set of color inks for which printing is not inhibited. The processor can further generate printer data from application print data, substituting the one or more substitute color inks when print data requires the first color ink.

Additionally, embodiments of the present invention include a method for controlling a multi-color printing device having a plurality of ink reservoirs for containing a plurality of color inks. In such a method, information is obtained identifying a first color ink for which printing is inhibited. In addition, one or more substitute color inks are identified from a set of color inks for which printing is not inhibited. The multi-color printing device prints from a set of reservoirs that contain the one or more substitute color inks when print data requires the first color ink.

The above discussed features and advantages, as well as others, may be readily ascertained by those of ordinary skill in the art by reference to the following detailed description and accompanying drawings.

BRIEF DESCRIPTION OF THE DRAWINGS

FIG. 6 shows an exemplary default color ink substitution table which may be implemented in a memory of the apparatus for generating printing data of FIG. 2.

DETAILED DESCRIPTION

Figure 1:
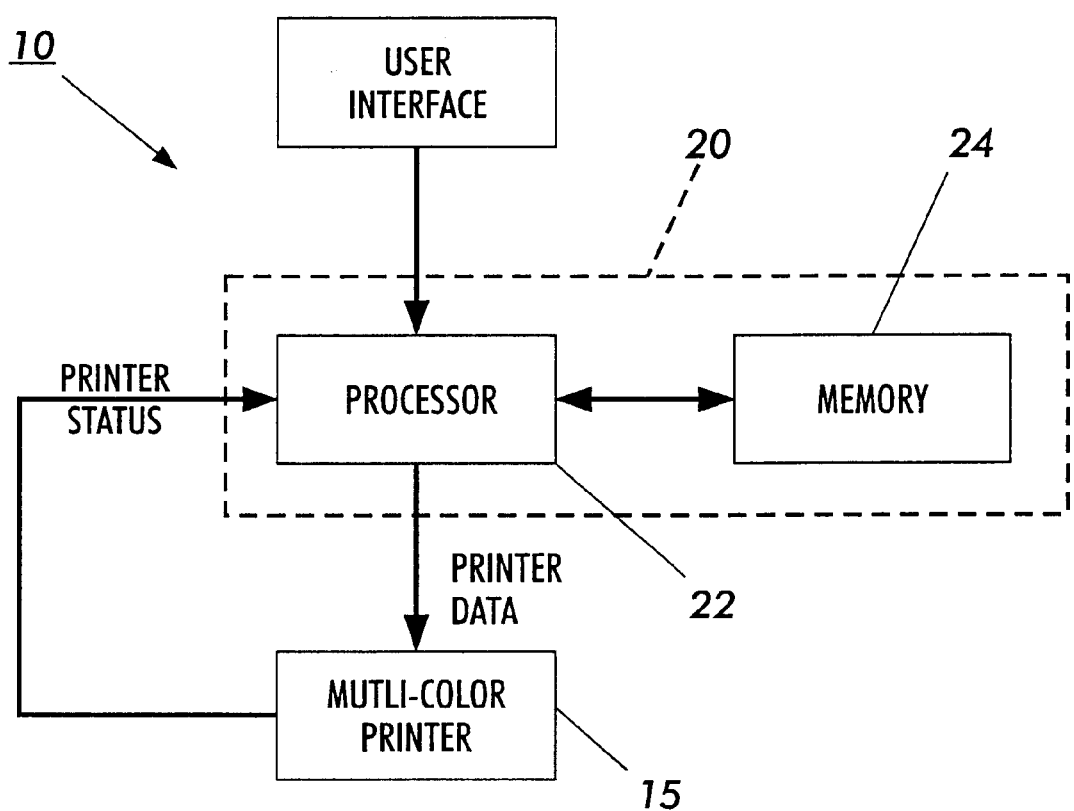
FIG. 1 shows a block diagram of a printing arrangement according to an embodiment of the present invention.

FIG. 1 shows a block diagram of a printing arrangement 10 including an apparatus 20 for generating printer data in accordance with embodiments of the subject invention. The printing arrangement includes a multi-color printing device. 15 in addition to the printer data generating apparatus 20. The printer data generating apparatus 20 further includes a processor 22 and a memory 24 for storing application print data.

The multi-color printing device 15 may suitably be a color ink jet printer, a color photographic copier, a color solid ink printer, or other type of printer that is capable of blending a plurality of color inks from a plurality of reservoirs to generate a large plurality of different color hues and tones.

The processor 22 can be a processor of a general purpose computer, or a controller of a multi-color printing device such as a processor within a photographic copier. In widely networked devices, the processor 22 need not be co-located with the multi-color printing device 15. Moreover, in various hybrid printer/copier devices, the processor 22 may either be that of a general purpose computer that is coupled to the device 15 through a network, or may be contained within the same housing as the multi-color printing device 15.

In general, the multi-color printing device 15 operates with printer data that is in the printer color space. In the printer color space, all of the printer data is expressed in terms of the available color inks. In typical implementations, the available color inks include cyan, magenta, yellow and black, which is referred to as the CMYK color space.

The memory 24 may suitably be any memory capable of storing application print data. As discussed above, application print data is typically data generated by an software application or the like. Application print data has not necessarily been expressed as a combination of existing ink colors. In other words, application print data is data that is not yet been transformed into printer color space. In a case in which the processor 22 is part of a general purpose computer, the application print data is typically expressed in RGB (red/green/blue) color space.

The processor 22 is generally operable to generate printer data from the application printer data. In other words, the processor 22 is operable to translate the application printer data into data that is expressed in the printer color space. The processor 22 is typically also operable to generate the (non-color) image data in a form that is useful to the multi-color printing device 15, such as, for example, raster scan information. The processor 22 is further coupled to provide printer data to the multi-color printing device 15.

The processor 22 is operably coupled to receive printer status information from the multi-color printing device 15. The printer status information includes, among other things, information as to whether the paper supply is empty, whether a paper jam exists, ink level information and/or other ink availability information.

The processor 22 is operable to obtain from the printer status information data identifying a first color ink for which printing is inhibited. Printing for the color ink may be inhibited due to an empty or nearly empty ink reservoir. However, printing may be inhibited due to a mechanism malfunction having an effect that is localized to inhibiting the printing of a single color ink.

The processor 22 is further operable to then identify one or more substitute color inks from a set of color inks for which printing is not inhibited. Thus, the processor 22 determines which of the remaining color inks should be used in place of the color ink for which printing is inhibited. In one embodiment of the present invention, discussed further below in connection with FIGS. 2–7, the substitute color ink can be a result of user selection. In the special case in which the color ink for which printing is inhibited is black ink, the processor 22 can substitute process black, which is a combination of a plurality of the remaining color inks that generates a composite resultant color of black. The generation of process black using a combination of available non-black inks would be known to those of ordinary skill in the art.

In any event, once the substitute color ink(s) are selected, the processor 22 is operable to generate printer data from application print data by substituting the one or more substitute color inks when print data requires the first color ink. Printing thus need not be halted for an extended period of time. In the case where process black is substituted for black color ink, the quality of the printing is not greatly affected. In the case in which a color ink must be substituted for a non-black color ink, the printing quality may suffer significantly, but in many cases the result may be tolerable for limited purposes. In either case, the user is not completely prohibited from at least some degree of further color printing due to the lack of availability of one color ink.

To illustrate the operation of the present invention, consider an exemplary printing job in which the application printer data includes five pages of print data that is mostly black text with the remainder being highlighted portions of red text. In general, the processor 22 generates print data from the application print data. For black text, the processor 22 generates print data for printing in black color ink. For red highlighted text, the processor 22 generates print data for printing in a combination of magenta and yellow color inks.

During the course of the print job, the printing device 15 from time to time provides the printer status information to the processor 22. Consider in the present example that the printing device 15 runs out of magenta ink after printing two pages of text. In such a case, the printing device 15 provides status information to the processor 22 that indicates that the printing of magenta color ink is inhibited.

The processor 22 then substitutes one of the remaining color inks for the magenta color ink. Alternatively, the processor 22 may substitute a combination of the remaining color inks. Assuming, however, that the substitute color ink is cyan, the processor 22 then continues the print job using the cyan color ink in the locations in which the magenta color ink is normally required. Thus, when the application print data shows red highlighted text, the processor 22 generates printer data for printing in a combination of cyan and yellow color inks, as opposed to magenta and yellow color inks.

Because cyan color ink is substituted for the magenta color ink, the printed highlighted text appears in a non-red color, in this case blue or blue green. Because a portion of the print job had been completed before the magenta color ink became unavailable, the overall document will thus include both red and bluish color highlighted text. Such a result is not preferable in a finalized formal document, but may be perfectly acceptable for draft purposes, or for internal or personal use. In addition, the user may elect to have the processor 22 cause the printing device 15 to reprint the first two pages using the substitute color ink.

In either event, the present invention allows the user to continue printing, even in color, despite the fact that printing is inhibited for one of the color inks. The user is not therefore required to immediately locate replacement ink in order to resume color printing.

In a variation of the above described example, consider a situation in which the printer 15 can no longer print using black color ink after two pages of printing. In other words, consider a situation in which the black color ink reservoir becomes empty. In such a case, the processor 22 identifies a process black combination of magenta, cyan, and yellow color inks as substitute inks. The processor 22 thereafter resumes the print job and employs that combination of color inks whenever the application printer data calls for black text print data. As a result of the substitution, the resultant print job may be completed and will have an appearance that is largely the same as it would have been had black color continued to be available.

The apparatus and method for generating printer data according to embodiments of the subject invention allows printing to continue in the event that a color ink reservoir becomes empty. Preferably, the user is provided the opportunity to define whether the ink substitution should take place, and if so, what substitutions to use. By providing a degree of user control, waste is avoided in situations in which substitute colors are not acceptable, for example, photographs or final copies of publication documents. To provide the user control, the processor 22 is preferably connected to a user interface 26 that allows the user to define the substitutes to be used, if necessary. Preferably, the processor 22 also queries the user via the user interface 26 whether ink substitution should take place at the moment when the printing for a particular color ink becomes inhibited.

Figure 2:
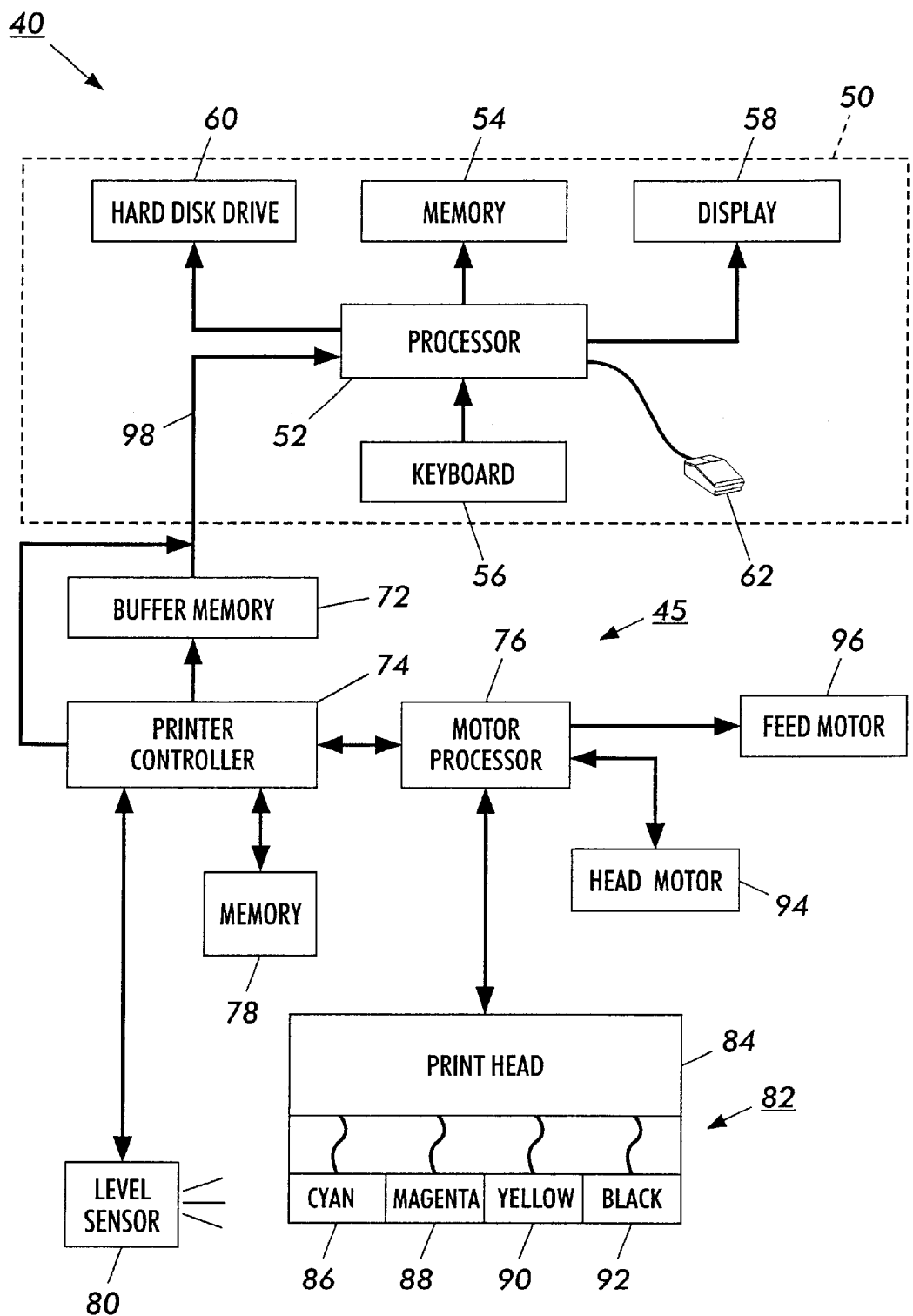
FIG. 2 shows in further detail a functional block diagram of an exemplary embodiment of the printing arrangement of FIG. 1.
Figure 7:
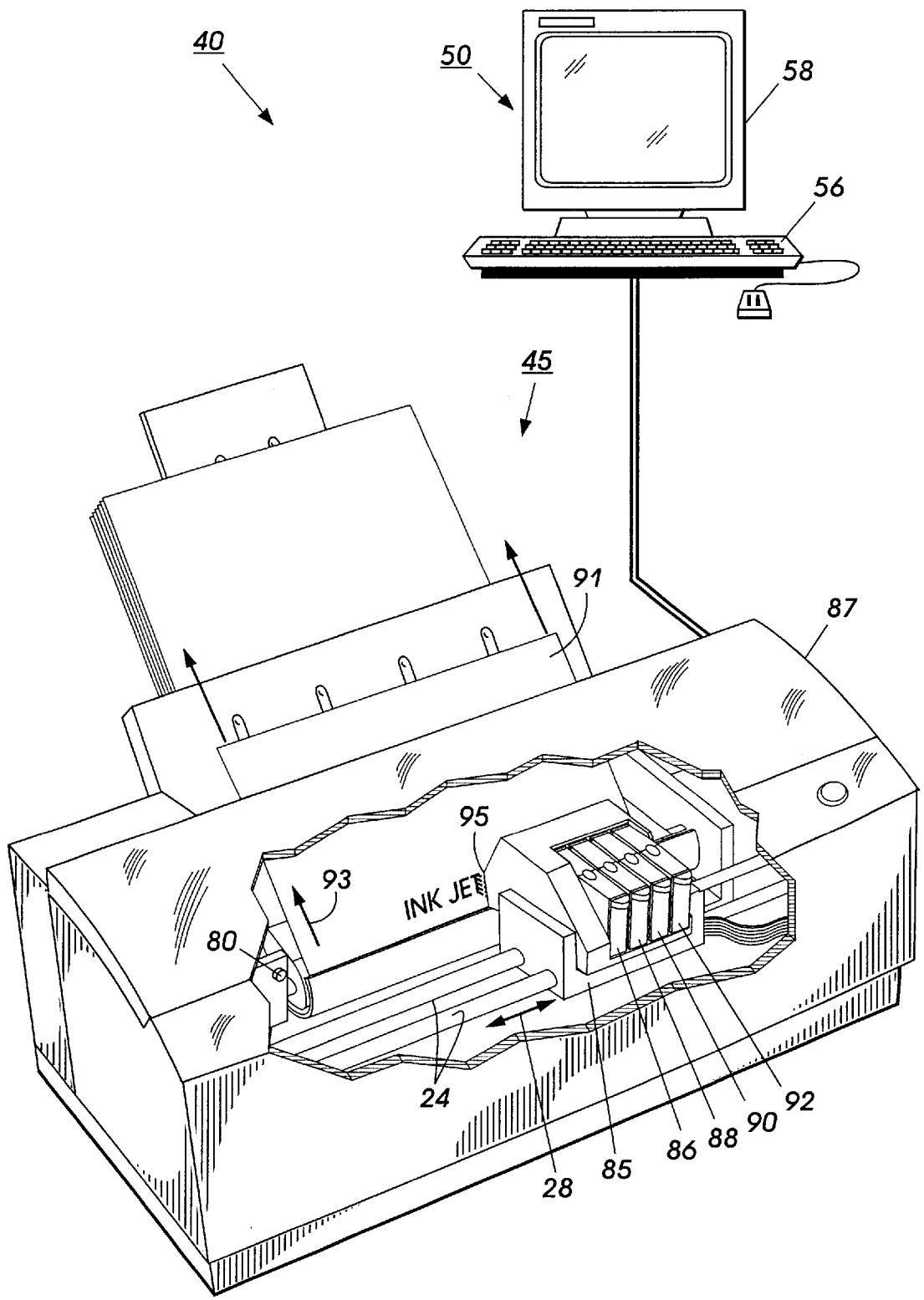
FIG. 7 shows a perspective view of the printing arrangement of FIG. 2.

FIGS. 2 and 7 show in further detail an exemplary embodiment of a printing arrangement 40 including an apparatus 50 for generating printer data. FIG. 2 shows the printing arrangement as a functional block diagram while FIG. 7 shows a perspective view of the exemplary apparatus. FIGS. 2 and 7 will be referenced simultaneously herebelow.

The printing arrangement 40 includes a multi-color ink jet printing device 45 in addition to the printer data generating apparatus 50. The printer data generating apparatus 50 is a general purpose computing device that includes, among other things, a processor 52 and a memory 54 for storing application print data. The printer data generating apparatus 50 also includes a keyboard 56, a display 58, and other peripherals which typically include a hard disk drive 60 and a mouse 62.

As is known in the art, the processor 52 is operably coupled to the memory 54 and the hard disk drive 60 to operably.store data thereto and retrieve data therefrom. The processor 52 is further operable to receive user input from the keyboard 56 and the mouse 62, and is further operable to display data via the display 58. It will be appreciated that suitable input/output devices, busses, and other glue logic, not shown, are employed to provide the operable connectivity between the various devices described above in a manner which would be known to those of ordinary skill in the art.

The multi-color ink jet printing device 45 includes a buffer memory 72, a printer controller 74, a motor controller 76, a memory 78, a level sensor 80, a print head assembly 82, a feed motor 96 and a housing 87. In general, the housing 87 supports a recording medium 91 to allow printing thereon via the print head assembly 82. The print head assembly 82 is supported by the housing 87 as described below.

With reference to both FIGS. 2 and 7, the print head assembly 82 further comprises a print head 84, a print head motor 94, a carriage 85, a cyan ink color reservoir 86, a magenta ink color reservoir 88, a yellow ink color reservoir 90, and a black ink color reservoir 92. With reference to FIG. 7, the print head 84 cannot be seen because it is hidden from view on the opposing side from the resevoirs 86, 88, 90 and 92. Likewise, the print head motor 94 is supported within the carriage 85 and thus cannot be seen in FIG. 7.

The carriage 85 is movably affixed to one or more carriage rails 89 to allow reciprocating movement of the carriage 85 under the movement force of the print head motor 94. As the carriage 85 reciprocates back and forth on the carriage rails 89, the print head 84 expels droplets of ink on the recording medium 91.

To this end, the print head 84 is a device that includes orifices, not shown, for applying each of the color inks stored in the reservoirs 86, 88, 90 and 92 to paper or other recording media 91 that is disposed proximate the print head 84. The cyan ink reservoir 86 is configured to contain cyan color ink, the magenta ink reservoir 88 is configured to contain magenta color ink, the yellow ink reservoir 90 is configured to contain yellow color ink, and the black ink reservoir 92 is configured to contain black color ink. Each of the ink reservoirs 86, 88, 90 and 92 are releasably secured to the print head 84. The ink reservoirs 86, 88, 90 and 92 are furthermore in fluid communication with the print head 84 to allow the color inks stored within the reservoirs 86, 88, 90 and 92 to be controllably applied to the printable medium through the print head 84.

The print head motor 94 is mechanically coupled to cause controlled movement of the print head 84. The feed motor 96 is coupled to controllably drive a paper feed mechanism, not shown, but which is located in the housing 87. The paper feed mechanism causes movement of the recording medium 91 in the vertical direction 93.

The level sensor 80 is a device that is operable to obtain information regarding the level of the ink in the ink reservoirs 86, 88, 90 and 92. In the exemplary embodiment described herein, the level sensor 80 is operable to determine, for each of the ink reservoirs 86, 88, 90 and 92, whether the level of that ink reservoir falls below a predetermined threshold, hereinafter referred to as the "low ink threshold". To this end, the level sensor 80 includes optical detection means and is located on the housing 87 at a position such that each of the ink reservoirs 86, 88, 90 and 92 pass through the line of sight of the optical detection means during the reciprocating movement of the print head assembly 82. However, it will be appreciated that other types of level sensors may be employed that obtain information regarding the level of ink within the ink reservoirs 86, 88, 90 and 92. The level sensor 80 is also preferably coupled to provide the low ink threshold information to the printer controller 74.

The buffer memory 72 is typically a first-in, first out type memory that is operably coupled via a communication link 98 to the processor 52 of the printer data generating device 50. The buffer memory 72 is operable to receive printer data and provide the printer data to the print controller 74 in a first in, first out manner.

The print controller 74 is a microprocessor, microcontroller, and/or other digital control circuitry that is operable to cooperate with the motor controller 76 to control the operation of the feed motor 96, the print head motor 94 and the print head 84 to print images onto the recording media 91 using the combination of color inks stored in the reservoirs 86, 88, 90 and 92.

In the general operation of the printing arrangement 40, the processor 52 obtains application print data from the memory 54, the hard disk drive 60, or a combination of both. The application print data is the print data generated by the application software, for example word processing software, computer aided design software, presentation software, or the like. The processor 52 generates printer data from the application print data as described further below in connection with FIGS. 3, 4 and 5. In general, the processor 52 performs a half-toning routine which converts the application image data to printer raster data. Such techniques are known. In addition, the processor 52 performs a color transform that converts the application color information to color information relating to the available color inks. In accordance with embodiments of the subject invention, the processor 52 performs the color transform using techniques that may include substitution of one or more color inks for a color ink for which printing is inhibited.

The processor 52 then provides the printer data to the buffer memory 72. The buffer memory 72 provides the printer data to the printer controller 74. More specifically, the processor 52 typically generates the printer data at a faster rate than the printing apparatus 45 can generate the printed output. Accordingly, much of the printer data is buffered in the buffer memory 72.

As the printer controller 74 receives the print data, it communicates with the motor controller 76 and coordinates with the motor controller 76 to cause the print head motor 94, the feed motor 96, and the print head 84 to cause selective application of the inks from the ink reservoirs 86, 88, 90 and 92 to the recording medium 91 to reproduce the image to be printed. In particular, the movement of the print head 84 and the release of ink by the print head is coordinated to reproduce the image 95 as defined by the printer data.

During the printing operation, the printer controller 74 from time to time provides printer status information to the processor 52 via the buffer memory 72. In addition, the level sensor 80 detects whether the ink level in any of the in reservoirs 86, 88, 90, and 92 falls below the low ink threshold. If so, then the level sensor 80 provides a signal to the printer controller 74 that is indicative of which ink level is below the low ink threshold. When the printer controller 74 obtains information that an ink level is below the low ink threshold, the printer controller communicates the information to the processor 52 via the printer status information.

It is noted that in some embodiments, the level sensor 80 may be replaced by a level sensor maintained by the processor 52. For example, the level sensor 80 can comprise a software counter that is arranged to determine the ink level by counting the number of "hits" on each color ink and subtracting from a predetermined number of "hits" available from the corresponding ink reservoir. The number of hits can be determined from the printer data that is generated by the processor 52, discussed further below. In such an embodiment, the processor 52 itself generates the printer status information that includes the information identifying whether a color ink is in need of substitution.

In any event, the processor 52 then, in accordance with either predetermined or user-determined instructions, substitutes one color ink for the color ink that is below the low ink threshold. To this end, the processor 52 performs the color transform in such a way to employ the substitute ink when the transform calls for the color ink that is below the low ink threshold. Further detail regarding one exemplary embodiment of the above described processes is provided below in connection with FIGS. 3, 4 and 5.

In the embodiments described herein in connection with FIGS. 2, 3, 4 and 5, it will be appreciated that the substitution occurs when the printer data is generated. As a result, the printing operations of the printer controller 74 and the motor controller 76 proceed in the same manner regardless of whether the substitution occurs. One issue that arises from performing the substitution at the time when the printer data is generated is that when a low ink level is detected by the detector, the printer buffer 72 has already received printer data that employs the original, unsubstituted colors. Thus, there is a time lag between the time a low ink level is detected and when the substitution begins. That time lag is defined by the amount of data in the printer buffer 72 when the low ink level is detected.

To this end, it is preferable that the level sensor 80 be configured to detect low ink in the reservoirs 86, 88, 90 and 92 at the point in which there is still at least enough ink to cover the remaining data in the buffer memory 72 at the time of detection.

In alternative embodiments, the processor 52, the buffer memory 72 and/or the printer controller 74 may be configured to allow the processor 52 to erase some or all of the contents of the buffer memory 72 after detection of a low ink level and then replace the data with replacement print data that employs the substitution color(s).

Returning to the general operation of the printing apparatus 45, the above operations continue until all of the processor 52 has converted all of the application print data to printer data, the processor 52 has provided all of the printer data to the buffer memory 72, and the printer controller 74 and the motor controller 76 have cooperated to cause the printing of the all of the printer data in the buffer memory 72.

As a result, the printer multi-color ink jet printing apparatus 45 and the printer data generating apparatus 50 can complete a print job, e.g., complete printing a document or file, even when one or more of the color inks in the ink reservoirs 86, 88, 90 and 92 become too depleted to be available for the entire print job. By contrast, in prior art devices, the print job would be halted until a replacement ink reservoir was installed. Because replacement reservoirs are not always readily available, and because many print jobs do not require precise color mapping, the use of a substitute color from one of the other reservoirs facilitates convenience to the user. The convenience provided by the advances of the subject invention also apply in the event that a color ink becomes unusable for another reason, such as a mechanical or electrical failure associated with a particular color ink.

Figure 3:
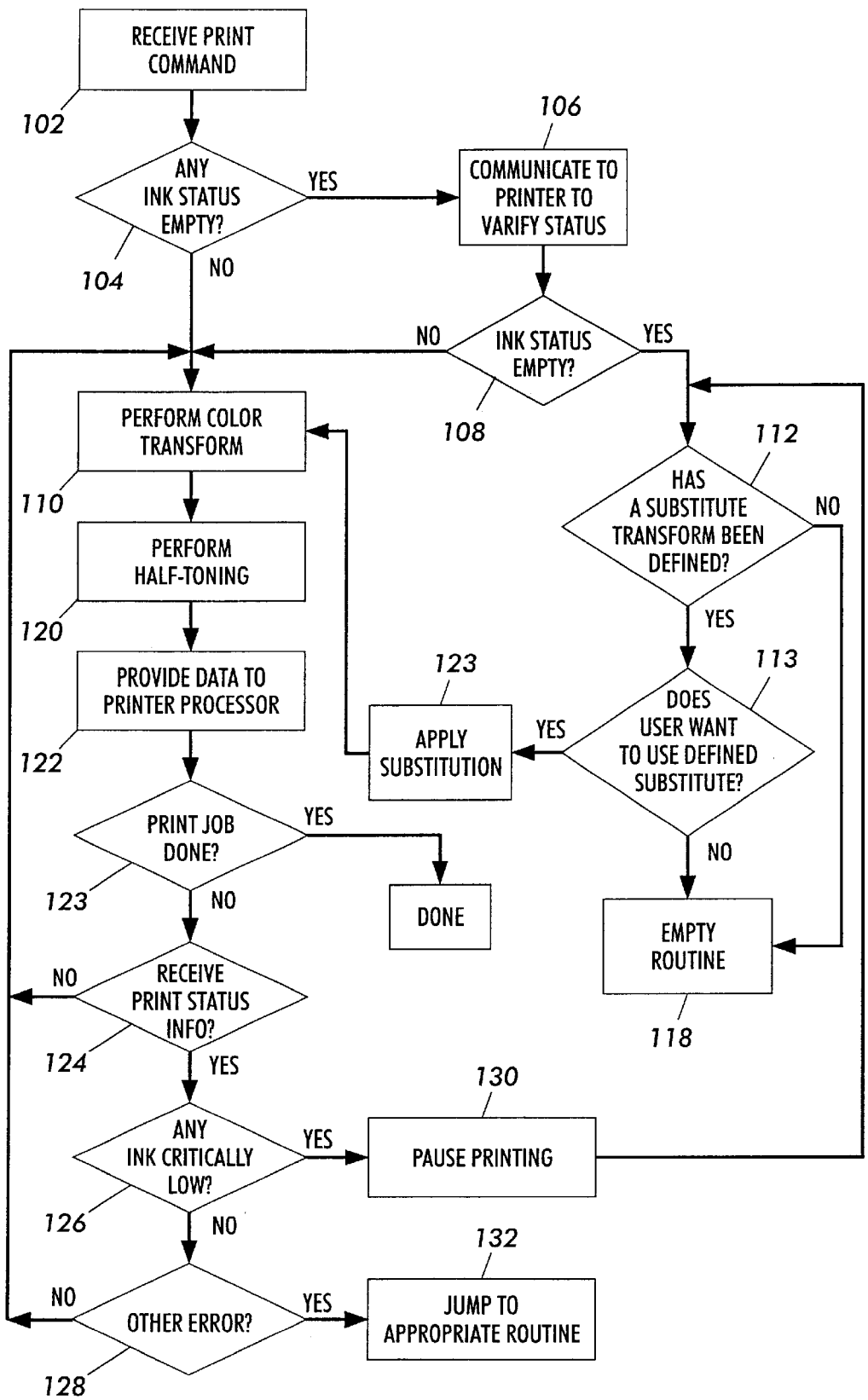
FIGS. 3, 4 and 5 show flow diagrams of the operations of the processor of the apparatus for generating printing data of FIG. 2.

FIG. 3 shows an exemplary set of operations of the processor 52 of FIG. 2. As necessary, other elements of FIG. 2 will be referenced as necessary to understand the context of the operations of the processor 52. It will be noted that the operations of FIG. 3 represent only one example of a sequence of steps that can be performed by a processor in embodiments of the subject invention.

As an initial matter, in step 102, the processor 52 receives a print command via a user application. The print command may, for example, be effectuated by an input signal from the keyboard 56. Upon receiving the print command, the processor 52 executes step 104. In step 104 the processor 52 determines whether any color ink status is "empty". In particular, one of the ink reservoirs 86, 88, 90 or 92 may have become empty during a prior print job. Thus, if the processor 52 obtained information during a prior print job identifying that one of the color inks was empty or near empty, the processor 52 retains that information until it obtains subsequent information that the status has changed. Thus, in step 104, the processor 52 determines whether the current status of any of the color inks is "empty".

If, in step 104, the processor 52 determines that the current status of a color ink is "empty", the processor 52 proceeds to step 106. If, however, the processor 52 determines that no color ink has a current status of "empty", then the processor 52 proceeds directly to step 110. In step 110, discussed further below, the processor 52 performs the color transform.

In step 106 (a color ink has the status "empty"), the processor 52 communicates with the printer controller 74 to obtain ink level information. To this end, the printer controller 74 may obtain sensor data from the level sensor 80 as described above. The processor 52 then determines from the ink level information whether the color ink in question is still consistent with the "empty" status. In other words, the processor 52 performs steps 106 and 108 to detect whether an empty ink reservoir has been replaced or refilled since that last print job.

If, in step 108, the processor 52 determines that the ink status of the color ink in question should be changed to "not empty", then the processor 52 changes the color ink status and proceeds to step 110. However, if the processor 52 in step 108 determines that the color ink still has a status of "empty", then the processor 52 proceeds to step 112.

In step 112, the processor 52 determines whether the user has previously defined a substitute transform for the "empty" color ink. If so, then the processor 52 proceeds to step 113. In particular, processor 52 may allow the user to predefine color ink substitutions during a printer "set-up" routine, not shown, but which is known in the art. A user may also have defined a color ink substitution during a prior print job.

The "set-up" routine may suitably be a well-known routine that allows the user to set certain parameters of operation of the printing process through dialog boxes displayed on the display 58 of FIGS. 2 and 7. During the set-up routine, the user may identify a sort of contingency plan of color ink substitutions in the event that one of the color inks becomes empty or unprintable during a print job.

In step 113, the processor 52 queries the user, via the display 58, whether the defined color substitution should occur. In particular, even if a user has defined a substitution color ink contingency plan through the set-up routine or during a prior print job, there are some applications in which certain color substitutions may not be appropriate. For example, substitution for cyan, magenta, or yellow colors may not be appropriate for highly detailed, color intensive files such as photographic images or the like. Thus, the user is provided the opportunity to bypass the predetermined substitution before the color substitution is implemented. The user-may further be allowed to configure via the set-up routine to skip step 113 and always perform the defined substitution, or to skip step 113 only in certain circumstances.

If the processor 52 receives indication that the substitution should occur, then the processor proceeds to step 114. If not, however, then the processor 52 proceeds to step 118 to perform the "empty routine", discussed below.

In step 114, the processor 52 implements the substitute color transform. In particular, the processor 52 sets a "substitute" flag and then stores information that associates the substitute color ink for the "empty" color ink. Thereafter, the processor 52 proceeds to step 110 to perform the color transform. The "substitute" flag and the information stored in step 114 are employed in the color transform step 110, discussed further below.

Figure 5:
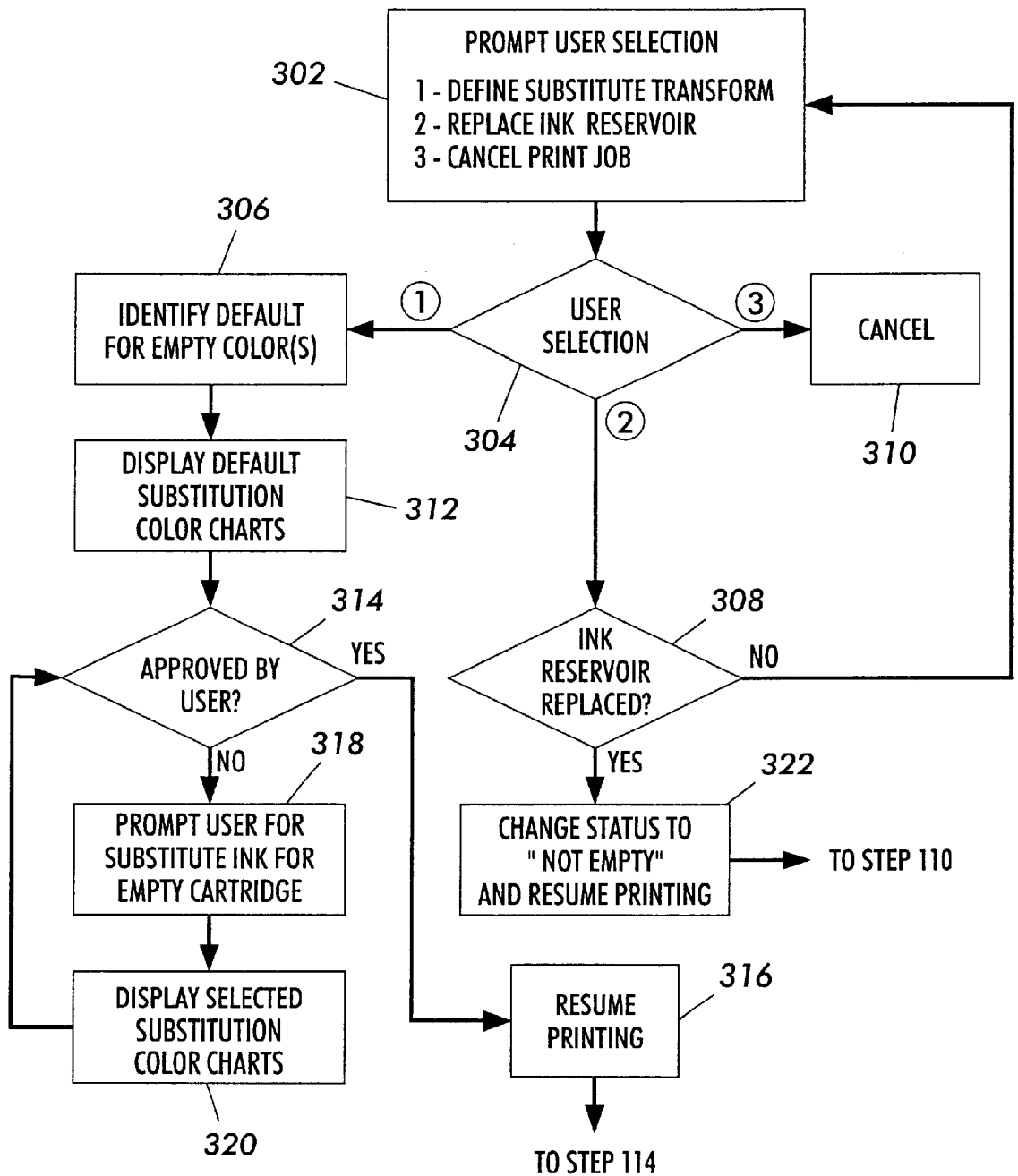

Referring again to step 112, if the processor 52 determines that a substitute transform has not been previously identified, the processor 52 proceeds to step 118. As discussed above, step 118 is an "empty routine" performed by the processor 52. In general, the "empty routine" is a routine that allows a user to determine what action should be taken if a color ink reservoir is no longer able to print (i.e. is in "empty" status). As discussed below, the user may halt printing until the cartridge is replaced, cancel the print job, or print using a substitute color transform. While such an empty routine may take various forms, an exemplary "empty routine" is shown in FIG. 5 and discussed further below.

Referring again to FIG. 3, the processor 52 in step 110 performs the color transform. In particular, the application printer data, which is represented in application color space, typically RGB color space, is converted into printer color data, typically in the CMYK color space. Thus, the color transform step generates as an output, color data in terms of the color inks employed within the printing apparatus 45. However, the generated color data may include color data only in terms of those color inks having a status of "not empty". To this end, any application color space data that maps to a color ink having a status of "empty" is remapped to the substitute color ink.

Figure 4:
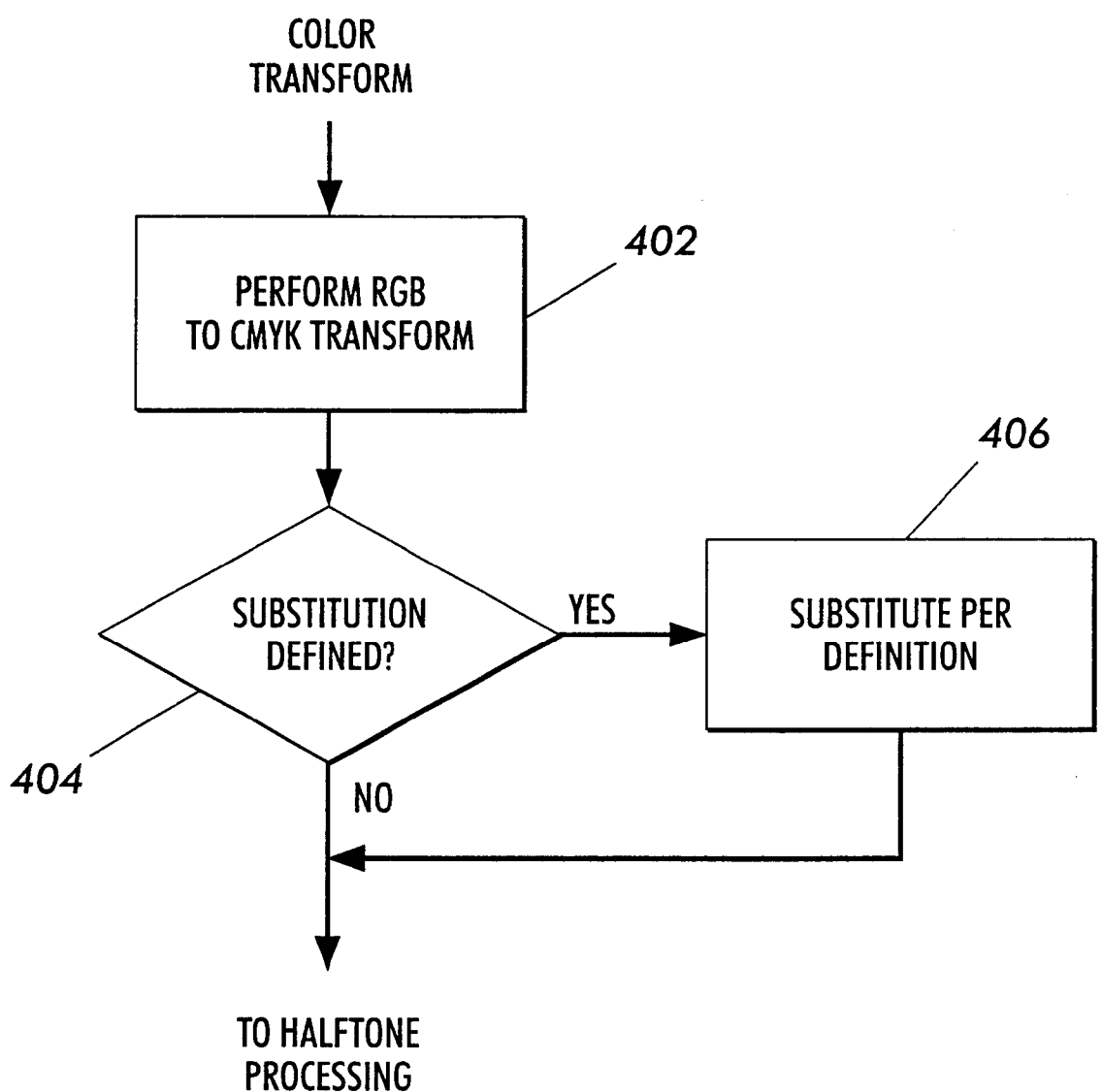

FIG. 4 shows in further detail an exemplary color transform operation according to an embodiment of the subject invention. The exemplary color transform operation includes steps 402, 404, and 406, as described below. Steps 402, 404 and 406 may suitably be used as step 110 of FIG. 3.

In step 402, the processor 52 converts the application color space data to printer color space data using any suitable technique. The conversion of step 402 is performed without regard as to whether a substitute color transform has been defined. In other words, even if the magenta color ink has a status of empty, the conversion of step 402 still generates printer color data that identifies magenta applications. In any event, the color transform of step 402 may suitably be a prior art color transform technique. Such techniques are well known in the art.

Thereafter, in step 404, the processor determines whether the "substitution" flag has been set, signaling that a color ink substitution has taken place. If not, then the processor 52 has completed the color transform and continues with the execution of step 120 of FIG. 3.

If, however, the processor 52 determines in step 404 that the substitution flag has been set, as by step 114 (FIG. 3), then the processor 52 executes step 406. In step 406, the processor 52 employs the color ink substitution information to replace references to the "empty" color ink in the generated printer color space data with references to the identified substitute color ink. Thus, the substitution is carried out after the actual mapping has taken place in step 402.

It is noted that alternative embodiments could allow direct mapping to the substitute color ink. For example, the prior art mapping algorithm of step 402 could be altered to map directly to the substitute color ink when the "empty" color ink would normally be used.

In any event, returning to FIG. 3, after step 110, or contemporaneously therewith, the processor 52 executes step 120. In step 120, the processor 52 performs half-toning on the application print data to complete the transformation of the application print data to printer data. Half-toning operations are well known in the art. The processor 52 then, in step 122, provides the resultant printer data to the printing apparatus 45. In step 123, the processor 52 determines whether the print job is complete. If so, then the operation ends. If not, then the processor 52 continues to step 124.

It will be appreciated that the processor performs steps 110, 120, 122 and 123 in an ongoing, contemporaneous manner. For example, the processor 52 can transmit a first block of data to the printing apparatus 45 in step 122 at about the same time, or interleaved with the performance of half-toning on a second block of data and the performance of the color transform on a third block of data.

In step 124, the processor 52 determines whether it has received printer status data from the printer controller 74. In particular, from time to time during the processing of the data in steps 110, 120 and 122, the processor 52 receives printer status data from the printer controller 74. While the receipt of the printer status data is represented as a sequential step in FIG. 3, the receipt of such data may suitably be detected as an interrupt during the performance of any of steps 110, 120, 122 and 123.

In any event, the printer status data includes information regarding whether any of the color ink reservoirs 86, 88, 90 and 92 have a low ink level. Other printer status data may include information identifying that the existence of a paper jam or that the paper is out.

If the processor 52 has not received printer status data, the processor 52 returns to step 110 and continues with the printing process. However, if the processor 52 in step 124 determines that it has received printer status data, then the processor proceeds to step 126. In step 126, the processor 52 determines if the printer status indicated that any of the color inks were below the low level threshold. If not, then the processor 52 continues on to execute step 128.

If, however, in step 126, the processor 52 determines that the one or more of the color inks were below the low level threshold, then the processor 52 pauses printing in step 130. The processor 52 preferably also changes the color ink status to "empty".

It is noted that in other embodiments, the processor 52 may not necessarily change the status of the color ink to "empty" until a predetermined amount of additional print data has been generated using the color ink in question. In such an embodiment, the low level threshold is chosen to be a level that identifies to the processor 52 that a certain amount of color ink still remains. The processor 52 could then estimate usage of the remaining amount to determine when the status should be changed to "empty".

Continuing again with the embodiment of FIGS. 2, 3, 4 and 5, once printing is paused in step 130, then the processor 52 proceeds to step 112, discussed above. In step 112, the processor 52 determines whether a substitute color has been defined, and then performs the "empty routine" in step 118 if a substitute has not yet been defined. During the "empty routine", the processor 52 determines whether to continue printing using a substitute color or to halt printing altogether.

Referring again to step 128 (no color ink level low), the processor 52 determines whether the printer status information received in step 124 requires any other action. In particular, step 128 represents the normal error handling and status information handling operations of the processor 52. For example, step 128 cause the processor 52 to inform the user via the display 58 that the paper tray is empty, that a paper jam exists, or that some other malfunction exists. Reference to step 128 is provided only for the purposes of context.

If, in step 128, the processor 52 determines that one or more conditions require action, then the processor performs the appropriate subroutine in step 132. If, however, the processor 52 determines that the printer status information does not identify any other actions to be taken, the processor 52 returns to step 110 to continue with the printing process.

The above-described operations show an exemplary set of operations of a processor in carrying out embodiments of the subject invention. In particular, the operations of the processor 52 in FIG. 3 not only allow for substitution of a color ink if one of the color inks is determined to be empty or near empty, the operations of the processor 52 allows the user to determine whether to perform the substitution or to simply await replacement of the empty color ink reservoir.

To this end, FIG. 5 shows an exemplary "empty routine" according to an embodiment of the present invention. As discussed above in FIG. 3, the empty routine is performed by the processor 52 upon determining that the status of a color ink is "empty" and no substitution color ink had yet been defined. The operations of FIG. 5 may suitably constitute step 118 of FIG. 3.

Referring to FIG. 5, the processor 52, in step 302, prompts a user selection between a plurality of options. In particular, the processor 52 prompts the user to select to 1) define a substitute color ink transform, 2) replace the ink reservoir in question, or 3) cancel the print job. To this end, the processor 52 can cause the display 52 to display the options for selection via the keyboard 56 or the mouse 62. Thereafter, in step 304, the processor receives the user selection and proceeds accordingly.

In particular, if the user elects to define a substitute color transform in step 304, then the processor 52 proceeds to step 306. If the user elects to replace the in reservoir in step 304, then the processor 52 proceeds to step 308. If the user elects to cancel printing in step 304, then the processor 52 in step 310 halts the printing job and completes its operation.

In step 306, the substitute color definition transformation begins with the processor 52 identifying and communicating to the user a default substitute color. In particular, a set of default substitutions are set up in memory to ease application of substitute color transforms for less sophisticated users. Indeed, such default substitutions may be used by even sophisticated users as a matter of convenience.

FIG. 6 shows an exemplary table of color ink substitutions that may suitably be used in embodiments of the invention. Information representative of the table in FIG. 6 may be maintained in the memory 54 or the hard-disk 60. In general, however, the substitutions for cyan, magenta and yellow color inks are a matter of design choice. Nevertherless, for black color ink, it is desirable to provide a combination of cyan, magenta and yellow, which produces a color known in the art as "process black", as the substitute if the "empty" color ink is black. By using process black as the substitute, the quality of the printed material is minimally impacted by the substitution.

With regard to the other color inks, it will be appreciated that combinations of other inks may be used as a substitute as opposed to the single color ink substitutes shown in FIG. 6.

Returning again to FIG. 5, after the processor 52 obtains the default color substitution that corresponds to the color ink that has the "empty" status, the processor proceeds to step 312.

In step 312, the processor 52 causes display of a chart of colors and how those colors would be affected by the default substitution. To this end, a routine may be used that mimics the color transform operation of FIG. 4 on a displayed palette of colors, using the defined substitution. The result of the "transform" is data representative of the palette of colors, as modified by the proposed color ink substitution, in CMYK color space. The processor 52 would then perform a reverse color transform to obtain the modified palette of colors in application (RGB) color space. The modified colors in RGB color space could then be displayed next to their original colors, for the user to compare and analyze.

Thereafter, in step 314, the processor 52 prompts the user to determine whether the displayed substitution is acceptable. If so, then the processor 52 proceeds to step 316 to resume printing. If, not, however, then the processor proceeds to step 318. In step 318, the processor 52 prompts the user to identify a substitute color ink via the keyboard 56 or mouse 62.

Once the user has identified a substitute color ink in step 318, the processor 52 in step 320 display a chart or palette of colors and how those colors would be affected by the substitution. To this end, step 320 may suitably perform the same operations as step 312, discussed above. After the palette of colors showing the proposed substitution is displayed in step 320, the processor 52 returns to step 314. In step 314, as discussed above, the processor 52 prompts the user for input identifying whether the proposed substitution is acceptable.

Referring to step 316, if at any time the user in step 314 identifies that a proposed color ink substitution is acceptable, then the processor 52 resumes printing and then proceeds to step 114 of FIG. 3. As discussed above, the processor 52 in step 114 implements the color substitution by setting the "substitute" flag and storing information identifying the color ink substitution. Such information is then referenced in the color transform operation (step 110 of FIG. 3) of the processor 52.

Referring again to FIG. 5, if the identified user selection in step 304 is ink reservoir replacement, then the processor 52 proceeds to step 308. In step 308, the processor 52 merely awaits replacement of the ink reservoir. In general, until the ink reservoir is actually replaced, the processor 52 can continue to prompt the user for selection in step 302 until the reservoir is replaced or another choice is selected. In any event, once the ink reservoir is replaced, the processor 52 proceeds to step 322. In step 322 the processor changes the status for the relevant color ink from "empty" to "not empty". Moreover, the processor 52 resumes the print job. After execution of step 322, the processor 52 returns to step 110 of FIG. 3.

The above-described embodiment thus provides some level of user control over when and what color ink substitutions should occur.

It is noted that embodiments of the present invention may not include all of the features described herein yet still benefit from at least some of the advantages of the invention. Those of ordinary skill in the art may readily devise their own such implementations that incorporate one or more of the features of the present invention and fall within the spirit and scope thereof.

What is claimed is:

1. A method comprising:
   obtaining information identifying, in a multi-color printing device having a plurality of ink reservoirs for containing a plurality of color inks, a first color ink for which printing is disabled;
   identifying one or more substitute color inks from a set of color inks for which printing is not disabled;
   causing a multi-color printing device to print from a set of reservoirs that contain the one or more substitute color inks when print data requires the first color ink, said causing the multi-color printing device to print further comprising performing a color transform on the print data from an application color space to a printer color space using the one or more substitute color inks.

2. The method of claim 1 wherein identifying one or more substitute color inks further comprises identifying from a user selection the one or more substitute color inks.

3. The method of claim 1 wherein identifying one or more substitute color inks further comprises prompting the user to identify the one or more substitute color inks.

4. The method of claim 1 wherein identifying one or more substitute color inks further comprises prompting the user to identify the one or more substitute color inks by selecting from one of a predetermined default selection or a user identified selection.

5. The method of claim 1 wherein
   obtaining information identifying the first color ink further comprises obtaining information identifying the first color ink as black ink; and
   identifying one or more substitute color inks further comprises identifying one or more substitute color inks from a set of color inks for which printing is not disabled, the one or more substitute color inks combinable to form process black.

6. A method comprising:
   obtaining information identifying, in a multi-color printing device having a plurality of ink reservoirs for containing a plurality of color inks, a first color ink for which printing is disabled because a first color ink reservoir is substantially empty;
   identifying one or more substitute color inks from a set of color inks for which printing is not disabled; and
   causing a multi-color printing device to print from a set of reservoirs that contain the one or more substitute color inks when print data requires the first color ink.

7. The method of claim 6 wherein identifying one or more substitute color inks further comprises identifying from a user selection the one or more substitute color inks.

8. The method of claim 6 wherein identifying one or more substitute color inks further comprises prompting the user to identify the one or more substitute color inks.

9. The method of claim 6 wherein identifying one or more substitute color inks further comprises prompting the user to identify the one or more substitute color inks by selecting from one of a predetermined default selection or a user identified selection.

10. The method of claim 6 wherein causing the multi-color printing device to print further comprises performing a color transform on the print data from an application color space to a printer color space using the one or more substitute color inks.

11. The method of claim 6 wherein:
   obtaining information identifying the first color ink further comprises obtaining information identifying the first color ink as black ink; and
   identifying one or more substitute color inks further comprises identifying one or more substitute color inks from a set of color inks for which printing is not inhibited, the one or more substitute color inks combinable to form process black.

12. An apparatus comprising:

a memory for storing application print data;

a processor coupled to the memory, the processor further adapted to be coupled to receive printer status data from a multi-color printer, the processor further adapted to provide printer data to the multi-color printer; the processor executing a method comprising obtaining from the printer status data information identifying a first color ink for which printing is inhibited, identifying one or more substitute color inks from a set of color inks for which printing is not inhibited, and performing a color transform on the print data from an application color space to a printer color space using the one or more substitute color inks.

13. The apparatus of claim 12 wherein the method executed by the processor further comprises identifying from a user selection the one or more substitute color inks.

14. The apparatus of claim 12 further comprising a display, and wherein the method executed by the processor further comprises providing display data to the display prompting the user to identify the one or more substitute color inks.

15. The apparatus of claim 14 wherein the method executed by the processor further comprises providing display data to the display and prompting the user to identify the one or more substitute color inks by selecting from one of a predetermined default selection or a user identified selection.

16. The apparatus of claim 12 wherein the method executed by the processor further comprises:

obtaining from the printer status data information identifying the first color ink as black ink; and identifying one or more substitute color inks from a set of color inks for which printing is not inhibited, the one or more substitute color inks combinable to form process black.

17. The apparatus of claim 12 wherein the method executed by the processor further comprises obtaining from the printer status data information that a first color ink reservoir is below a predetermined threshold.

18. The apparatus of claim 12 wherein the method executed by the processor further comprises generating printer data from application print data by:

performing a color transform on the application print data, substituting the one or more substitute color inks when print data requires the first color ink; and performing half-toning on the application print data.

19. An apparatus comprising:

a memory for storing application print data;

a processor coupled to the memory, the processor further adapted to be coupled to receive printer status data from a multi-color printer, the processor further adapted to provide printer data to the multi-color printer; the processor executing a method comprising obtaining from the printer status data information identifying a first color ink for which printing is inhibited because a first color ink reservoir is substantially empty, identifying one or more substitute color inks from a set of color inks for which printing is not inhibited, and generating printer data from the application print data, substituting the one or more substitute color inks when print data requires the first color ink.

20. The apparatus of claim 19 wherein identifying one or more substitute color inks further comprises identifying from a user selection the one or more substitute color inks.

* * * * *